United States Patent [19]
Svejkovsky et al.

[11] Patent Number: 6,119,849
[45] Date of Patent: Sep. 19, 2000

[54] LINEAR MOTION CONVEYOR WITH GATE MECHANISM AND METHOD

[75] Inventors: Paul B. Svejkovsky, Coppell, Tex.; Paul A. Svejkovsky, Rte. 2, Box 338-A, Marquez, Tex. 77865

[73] Assignee: Paul A. Svejkovsky, Marquez, Tex.

[21] Appl. No.: 09/251,516

[22] Filed: Feb. 17, 1999

[51] Int. Cl.[7] .................................................. B65G 21/00
[52] U.S. Cl. ........................................ 198/860.4; 198/735
[58] Field of Search ........................... 198/369.7, 370.01, 198/735, 671, 860.4

[56] References Cited

U.S. PATENT DOCUMENTS

| | | |
|---|---|---|
| 1,401,155 | 12/1921 | Jacoby . |
| 2,776,741 | 1/1957 | Carrier, Jr. . |
| 3,042,360 | 7/1962 | Sneddon . |
| 3,074,534 | 1/1963 | Thiele . |
| 3,077,975 | 2/1963 | Hobbs, Jr. . |
| 3,315,792 | 4/1967 | Tyndall . |
| 3,342,315 | 9/1967 | Godley . |
| 3,511,363 | 5/1970 | Sibitz . |
| 3,586,155 | 6/1971 | Turremtine et al. . |
| 3,731,787 | 5/1973 | Gregor . |
| 4,023,673 | 5/1977 | Hansen . |
| 5,351,807 | 10/1994 | Svejkovsky . |
| 5,526,920 | 6/1996 | Ellsworth ................................ 198/671 |
| 5,794,757 | 8/1998 | Svejkovsky et al. . |
| 5,842,678 | 12/1998 | Svejkovsky . |

*Primary Examiner*—James R. Bidwell
*Attorney, Agent, or Firm*—Browning Bushman

[57] ABSTRACT

A gated conveyor 10 includes a conveyor tray 12 having a substantially planar tray floor 14 and tray sides 16, 18. A powered drive mechanism 30 cyclically moves goods along the tray. A gate mechanism 40, 70 includes a flexible gate sheet 42, 82 transversely movable from an opened position to a closed position. A floor opening is provided in the tray floor and a side opening is provided in at least one of the tray sides 16, 18. The gate sheet moves transversely with respect to the tray floor and vertically with respect to the opening in the tray side. According to the method of the invention, the opening in the tray side extends upward from the tray floor a distance greater than the anticipated depth of the goods moving along the tray, such that goods are not pinched when the flexible gate sheet is moved to the closed position.

20 Claims, 3 Drawing Sheets

LINEAR MOTION CONVEYOR WITH GATE MECHANISM AND METHOD

FIELD OF THE INVENTION

The present invention relates to an improved gate mechanism for a conveyor of the type which cyclically moves goods along an elongate conveyor tray having a substantially planar tray floor. More particularly, this invention relates to a vibratory or linear motion conveyor and to an improved powered gate mechanism for such a conveyor.

BACKGROUND OF THE INVENTION

Various types of gate mechanisms have been devised for particular types of conveyors. Conveyors with a generally tubular construction, such as screw conveyors and conveyors of the type disclosed in U.S. Pat. No. 3,586,155, may employ a rotary gate mechanism to either allow product to discharge through the opened gate or to move product downstream from the closed gate. Various types of rotary gate mechanisms are disclosed in U.S. Pat. Nos. 1,401,155, 3,074,534, 3,077,975, and 3,342,315. U.S. Pat. No. 4,023,675 discloses a slide door for use with a chain conveyor. U.S. Pat. No. 3,731,787 discloses a slide gate with sensors.

An increasingly common type of conveyor utilizes a substantial planar tray floor and a cyclically powered drive mechanism cyclically powered to move the goods along the tray floor. One type of conveyor which utilizes such a cyclically powered tray is a vibratory conveyor, and another type of conveyor which uses a similar cyclically powered tray is a linear motion conveyor. Both vibrating and linear motion conveyors commonly employ a substantially planar tray floor with opposing sides, and thus are sometimes referred to as a trough-type conveyor. The stroke in a vibratory conveyor is relatively short, and typically is approximately 1/16th of an inch, so that the tray imparts an upward and forward motion to the goods. The tray is returned to its original position while the goods are out of contact with the tray floor. A linear motion conveyor has a much longer stroke, typically in the range of approximately an inch and a half, and moves the goods slowly forward and returns the tray quickly while the goods slide along the tray floor. A slide gate for a trough-type conveyor is disclosed in U.S. Pat. No. 2,716,741. More complex and specialized types of gates for conveyors with a planar tray floor are disclosed in U.S. Pat. Nos. 3,042,360, 3,315,792, and 3,511,303.

Conventional gate mechanisms for conveyors with a planar tray floor have various problems which have limited their acceptance in the industry. Traditional gate mechanisms are intended to operate in the fully opened or fully closed position. This limitation prevents equipment downstream from the conveyor from receiving a steady flow of product, and thus results in poor production efficiency. Some conveyor manufacturers have attempted to overcome this problem by utilizing triangular shaped cutouts in the conveyor floor and allowing the gate mechanism to be positioned at selected intervals between the fully opened and fully closed position. The use of such triangular shaped cutouts requires a great deal of space along the length of the conveyor, and also requires a linear actuator which is capable of sliding the gate over a relatively long movement.

A significant problem with conventional gate mechanisms for trough-type conveyors with a planar tray floor involves the inability of the gate to completely seal in the closed position. Trough-type conveyors are commonly used to transport snack foods and fine particles associated with such goods have caused a growing problem when high hygiene is critical. Some companies have required specialized devices to prevent unwanted particles, such as dust associated with a transported goods, from leaking out of a closed gate and into another product line. Many slide gates associated with trough-type conveyors have a difficult time sealing the gate area when in the closed position because product is passing through a gate while it is being closed. The product may thus become jammed in the gate sealing area, resulting in both product breakage and the buildup of material to prevent complete gate closing. A related problem is that the gate seal is commonly exposed to the product when the gate is partially or fully opened. As the product passes by the gate seal, the sealing material is worn and thus prevents a reliable seal from substantially being formed when the gate is in the closed position.

The disadvantages of the prior art are overcome by the present invention, and an improved gate mechanism is hereinafter disclosed for a trough-type conveyor. The gate mechanism of the present invention may be used on either vibratory conveyors or horizontal motion conveyors. The improved gate mechanism has a long life and a reliable operation.

SUMMARY OF THE INVENTION

One embodiment of the invention is a gated conveyor for moving goods along an elongate tray and for selectively discharging goods through an opening in the conveyor tray. The tray of the gated conveyor conventionally has a tray floor and a pair of opposing tray sides. A powered drive mechanism cyclically moves goods along the tray floor. The gated conveyor includes a gate mechanism for selectively opening and closing the tray opening. The gate mechanism utilizes a flexible sheet transversely movable between an opened position and a closed position. The flexible sheet is movable both transversely with respect to the tray floor and vertically with respect to at least one of the tray sides. In a preferred embodiment of the invention, a powered drive member is provided for moving the flexible gate sheet. A plurality of biasing members may be used for biasing the flexible gate sheet into engagement with the conveyor tray.

Another embodiment of the invention is a gate mechanism for selectively discharging goods from a conveyor opening. The gate mechanism includes a gate housing for interconnection with an upstream portion and a downstream portion of an elongate tray. The gate housing may have a floor opening and an opening in at least one of the housing sides extending upward from the floor opening. The flexible gate sheet is supported on the gate housing and is transversely movable between an opened position and a closed position by a powered drive member. The opening in at least one of the housing sides may extend upward from the housing floor, preferably at least 8 cm, such that when the gate sheet is closed, the goods transported along the conveyor are not pinched between the closing gate sheet and the gate housing.

According to the method of the invention, an opening is provided in the tray floor and preferably in at least one of the tray sides, with the opening in the tray side extending upward from the tray floor a distance greater than the anticipated depth of the goods moving along the tray. The flexible gate sheet is provided transversely movable from an opened position to a closed position. The flexible gate sheet is moved both transversely with respect to the tray floor and vertically with respect to at least one of the tray sides to discharge the goods through the conveyor opening. When the flexible gate sheet is closed, the goods move along the conveyor and past the flexible gate sheet.

It is an object of the present invention to provide an improved gated conveyor and a gate mechanism for a conveyor of the type having a cyclically movable tray with a tray floor and tray sides. It is a further object of the invention to provide an improved conveyor and a gate mechanism for a conveyor which minimizes damage to goods transported along the conveyor during closing of the gate, and which reliably allows the closed gate to seal with the conveyor tray.

Another object of the invention is an improved method of selectively discharging goods through a conveyor opening by providing an opening in a tray floor and preferably in at least one of the tray sides, with the opening extending upward from the tray floor a distance greater than the anticipated depth of the goods moving along the tray. By moving the flexible gate sheet from the closed to the opened position, the opening in the tray floor and the at least one of the tray sides may be exposed to allow goods to discharge from the conveyor. By moving the flexible gate sheet from the opened to the closed position, the drive mechanism for the tray reliably transports the goods along the conveyor and past the gate mechanism.

It is a feature of the present invention that the gate mechanism may be used with either a vibratory conveyor or linear motion conveyor. A related feature of the invention is that the gate mechanism is well suited for use with trough-type conveyors used in the food processing industry. Another feature of the invention is that the gate mechanism may be easily and reliably controlled to regulate the partial discharge of goods from the conveyor. Yet another feature of the invention is that the gated conveyor and the gate mechanism may be easily cleaned and have a relatively long life.

A significant advantage of the present invention is that the gated conveyor and the gate mechanism are relatively simple, while their operation is highly reliable. A related advantage of the invention is an improved gated conveyor and a gate mechanism which have a relatively low cost and a long life. The gate mechanism is relatively compact, and need not extend longitudinally a great distance along the conveyor or transversely a significant distance past the tray sides. The gate mechanism of the present invention or a combined gate mechanism and conveyor tray of this invention may also be installed in existing cyclically powered conveyors systems of the type which use an elongate tray with a tray floor and tray sides.

These and further objects, features, and advantages of the present invention will become apparent from the following detailed description, wherein reference is made to the figures in the accompanying drawings.

DETAILED DESCRIPTION OF PREFERRED EMBODIMENTS

Figure 1:
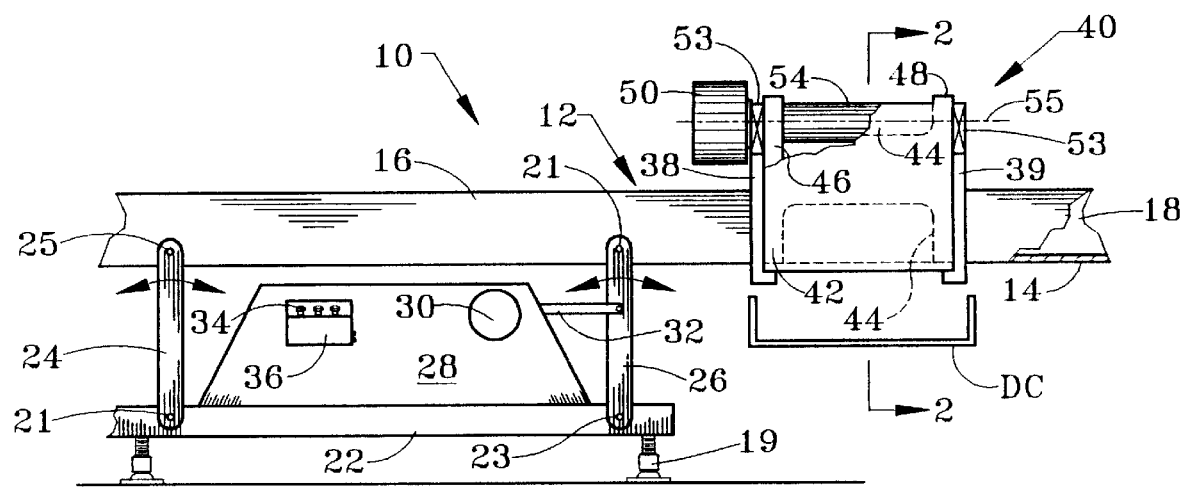
FIG. 1 is a side view of a suitable gated conveyor according to the present invention. The depicted conveyor is a linear motion conveyor with the conveyor tray supported on a plurality of support members pivotally connected at one end to a base and at another end to the conveyor tray.

FIG. 1 discloses one embodiment of gated conveyor 10 which includes an elongate tray 12 for moving goods longitudinally along the tray. The tray 12 has a substantially planar floor 14 for supporting the transported goods thereon, and first and second tray sides 16, 18 on opposing sides of the tray floor. The right-hand end of the tray side 16 has been removed in FIG. 1, illustrating the tray floor 14 and the opposing tray side 18. The conveyor 12 includes a gate mechanism 40 discussed subsequently for selectively opening to drop goods from the conveyor 12 onto the downstream conveyor DC. When the gate mechanism 40 is closed, the goods move from the upstream portion to the conveyor 12 past the gate mechanism 40 and to the downstream portion of the conveyor 12.

The depicted conveyor 10 includes a base 22 which may be supported on a plurality of adjustable leg supports 19. A plurality of substantially vertical pivotal support members 24, 26 are pivotally connected at 21, 23 to the base 22, and are similarly pivotally connected at 25, 21 to the tray 12. Those skilled in the art should appreciate that the tray 12 may be supported in a variety of manners. Conventionally the supports 24, 26 extend upward to pivots which are connected to the sides 16, 18 of the tray 12. Various other types of support members may be used for supporting the tray. The gate mechanism 40 may be positioned either upstream or downstream from the plurality of tray supports. In another embodiment, the gate mechanism 40 may be spaced between upstream tray supports and downstream tray supports. For the present, it should be understood that the gate mechanism 40 cyclically moves with the tray 12 in response to the tray drive mechanism, as explained subsequently.

The conveyor 10 also includes a fixed support 28 which is rigidly connected to the base 22. A powered drive mechanism, such as a drive motor 30, is provided for powering crank arm 32, which in turn is pivotally connected to one of the tray supports. Those skilled in the art will appreciate that the powered drive mechanism cyclically moves the tray supports 24, 26 forward and backward, thereby similarly moving the tray 12. The gated conveyor 10 as shown in FIG. 1 is a linear motion conveyor, and accordingly the powered drive mechanism 30 moves the tray slowly forward and then more quickly backward in a cyclical manner, with the goods sliding along the tray during the backward movement of the tray 12. Another embodiment of the invention may include a powered drive mechanism for driving a vibratory conveyor, wherein the drive mechanism moves in a cyclical manner to impart a forward and upward motion to the goods during forward motion of the tray, with the goods being suspended in the air while the tray cyclically returns to its prior position.

FIG. 1 also illustrates the plurality of operator selective controls 34 for regulating operation of both the powered drive mechanism 30 and for controlling the power to the gate mechanism 40. An automated conveyor control station 36, which preferably includes one or more computers, may be provided for regulating operation of both the tray drive mechanism 30 and the motor which powers the gate mechanism 40. Further details with respect to the various components discussed above, including various types of drive mechanisms for powering a linear motion conveyor, are disclosed in U.S. Pat. Nos. 5,351,807 and 5,794,757. A suitable machinery mount 19 for supporting the base 20 and for leveling the tray 12 is disclosed in U.S. Pat. No. 5,842,678.

The gate mechanism 40 may include an upstream plate 38 and a downstream plate 39 each rigidly attached to an upstream portion and a downstream portion, respectively, of the tray 12. The gate mechanism 40 also includes a flexible gate sheet 42 which, as shown in FIG. 1, is in its closed position for preventing discharge of goods from the conveyor 10. When the gate mechanism is closed, the goods thus move past the flexible gate sheet 42 to the right as shown in FIG. 1, i.e., to the downstream portion of the conveyor 12. When the flexible plastic sheet 42 is in its opened position, the sheet opening 44 is represented by the dashed lines as shown in FIG. 1. The opened gate sheet 42 discharges goods from the tray 12 to the downstream conveyor DC. Accordingly, operation of the gate mechanism 40 selectively moves goods past the closed gate mechanism, and discharges goods from the gate mechanism when in the opened position.

The gate mechanism 40 includes a rotary actuator 50, which in a preferred embodiment may be an electrically powered motor controlled manually by the operation of one of the controls 34 or automatically by a computer in the control station 36. The rotary actuator 50 drives a shaft 54 which is mounted between the plates 38, 39 and is supported on suitable bearings 53. The shaft 54 thus rotates about an axis 55 to drive the flexible gate sheet 42 between the opened and the closed positions.

Figure 2:
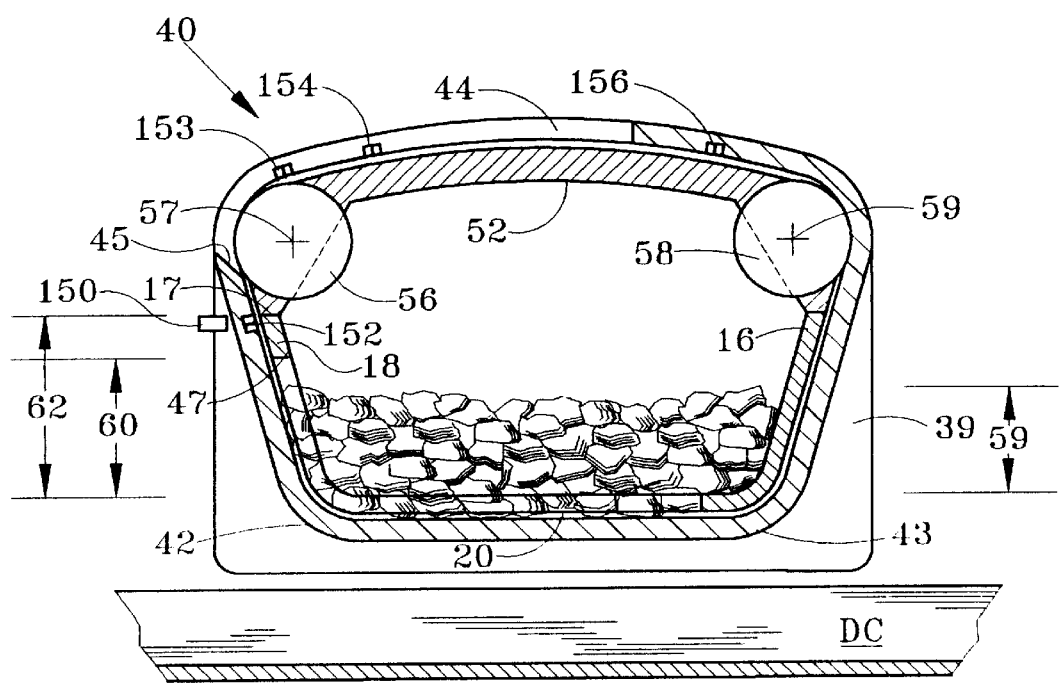
FIG. 2 is a cross-sectional view taking along lines 2—2 in FIG. 1.

Referring to FIGS. 1 and 2, the depicted flexible gate sheet 42 is a looped belt sheet having a sheet opening 44 therein. The looped belt sheet 42 thus includes a solid sheet portion 43 which covers the opening 20 in the tray 12 when the gate mechanism is in the closed position, as shown in FIG. 2. The flexible gate sheet 42 also includes an upstream flexible strap 46 and a downstream flexible strap 48 which define the opening 44 longitudinally therebetween. Each end of the flexible strap 46, 48 is connected to the solid sheet portion 43, thereby forming a continuous looped belt having a sheet opening 44 therein, with the opening 44 being spaced between the upstream and downstream straps 46, 48. The gate sheet 42 is preferably a unitary and homogeneous sheet having the gate opening therein. Ends of a gate sheet may be removably connected, e.g., with a pin mechanism extending between the upstream and downstream edges, thereby forming a continuous looped belt. The pin mechanism facilitates gate sheet removal for either cleaning or replacement. The gate sheet may be fabricated from a thin flexible metal material, such as stainless steel, or may be fabricated from a plastic or elastomeric (rubber) material.

Referring to FIG. 2, the rollers 56 and 58 are each supported by one of the plates 38 and 39. The drive roller 58 rotates about an axis 59 in response to operation of the rotary actuator 50. On the transverse side of the gate mechanism 40 shown in FIG. 1 (the left side of the gate mechanism shown in FIG. 2), the idler roller 56 similarly rotates about axis 57. The rollers 56 and 58 may each have a uniform diameter extending between the upstream and downstream edges of the sheet 42. The long uniform diameter rollers optimize engagement of the rollers with the sheet 42 to reliably drive the sheet. Alternatively, each roller 56, 58 may be replaced with a short upstream roller and a short downstream roller for engaging the upstream and downstream portions of the sheet, respectively, and a shaft 54 then used to mechanically interconnect the rollers. In this case, the shaft 54 would preferably have a diameter less than that depicted in FIG. 1.

Assuming the looped belt sheet 42 is in the closed position as shown in FIG. 2, the rotary actuator 50 may be powered for rotating the sheet 42 in the clockwise direction, thereby rotating the opening 44 to a position such that the sheet opening 44 is substantially aligned with the tray opening 20. The tray opening 20 is preferably provided in both the tray floor 14 and at least one of the tray sides, e.g., side 18. When the sheet 42 is in the opened position, the goods are thus discharged from the tray 12 onto the downstream conveyor DC. When the sheet 42 is in the opened position, the rotary actuator 50 may subsequently be activated to continue rotation of the sheet 42 in the clockwise direction to return the sheet opening 44 to the position as shown in FIG. 2, thereby covering the tray opening 20. In an alternate embodiment, the rotary actuator 50 may be driven in one direction to rotate the looped belt from the closed to the opened position, and in the reverse direction to move the looped belt from the opened to the closed position. In a less desired embodiment of the invention, the actuator 50 may rotate the looped belt 42 as shown in FIG. 2 in the counterclockwise direction rather than in the clockwise direction.

The flexible gate sheet 42 may be moved between the opened and closed positions without trapping goods between the tray edges of the tray opening 20 and the edges of the sheet opening 44 by clockwise rotation of the sheet 42 as shown in FIG. 2. This result may be obtained because the tray opening 20 in the side of the conveyor extends upward above the anticipated level of the goods moving along the conveyor. Referring to FIG. 2, the vertical spacing between the supporting surface of the tray floor 14 and the anticipated level of the goods is the vertical spacing 59. The spacing between the supporting surface of the tray 14 and the uppermost edge 17 of the tray side 18 is the spacing 62, and the spacing between the supporting surface of the tray floor 14 and the top 47 of the opening 20 in the tray side 18 is the spacing 60. The spacing 60 is at least 8 cm for most conveyor trays, and in many conveyor trays is 12 cm or more, since the tray sides are typically 15 cm high or more. When moving to the closed position as shown in FIG. 2, the top of the opening 20 is vertically higher than the depth of goods in the tray 12 (60 is greater than 59) so that, as the flexible sheet is closed, the goods simply fall off the trailing edge 45 of the flexible sheet and are not trapped between the flexible sheet and the tray side. If the opening 20 is provided in a gate housing rather than the tray, the top of the opening could be above the top of the tray. To reduce the likelihood of any goods remaining on the edge 45 of the tray sheet, this trailing edge 45 may be angled, as shown in FIG. 2, so that goods slide downward during this closing operation. The opening 20 in the tray side thus extends upwardly from the tray floor at least 60%, and preferably at least 75%, of the vertical spacing between the tray floor 14 and an uppermost end 17 of the respective tray side 18, i.e., spacing 60 is at least 60% of spacing 62. When in the closed position, the trailing edge 45 of the solid section 43 of the looped belt 42 is thus above the top of the opening in the tray side, thereby closing off the tray opening 20.

Since the surface 47 is spaced vertically above the anticipated maximum height of the goods moving along the conveyor, the movement of the goods along the conveyor does not rub up against the surface 47. Prior art gate mechanisms commonly included a seal between the gate and the tray to minimize leakage of goods or fragments of goods from a closed gate. Since the gate only moved longitudinally with respect to the tray floor, a gate without such a seal would tend to leak some of the goods past the closed gate. Pinching of the goods between the edge of the opening and the gate thus tended to wear the seal and prevented continuous reliable sealing engagement with the gate. Goods thus tend to be damaged during the closing operation, and the goods trapped against the seal in combination with the wear of the seal as the goods move along the conveyor and past the seal tended to minimize the effective life of the seal. Goods are not damaged during closing of the gate mechanism according to the present invention. Problems with seal wear and seal life are avoided, since no seal is required between the side of the conveyor and the flexible gate sheet due to the positioning of the side opening in the conveyor above the anticipated level of goods moving along the conveyor. This opening in the side of the conveyor thus avoids the problems associated with goods leaking past a worn seal in prior art gate mechanisms.

The drive for the flexible sheet 42 may include a rotary drive motor 50 and the rotary drive rollers 58 powered by the motor, such that the drive members or drive rollers 58 engage and move the flexible gate sheet 42. The flexible straps 46, 48 thus provide the continuous loop belt configuration for driving the belt when the opening 44 in the flexible sheet 42 approaches the drive rollers 58. The idler rollers 56 need not be powered by the rotary actuator 50, and may simply be serving a guiding function.

The upstream and downstream plates 38 and 39 provide a convenient means for securely positioning the upstream and downstream drive rollers 58 and the upstream and downstream idler rollers 56 with respect to the tray 12. Functionally, the plates 38 and 39 may be considered part of the tray 12. If the upstream and downstream plates 38 and 39 are not utilized, a structural support member, such as upper plate 52 as shown in FIG. 2, may be used to interconnect the uppermost end of the tray 18 with the uppermost end of the tray 16, thereby providing the desired structural support for the drive rollers 58 and the idler rollers 56. The flexible sheet loop belt 42 may thus be adequately supported by a variety of mechanisms for serving the purpose described herein.

Figure 3:
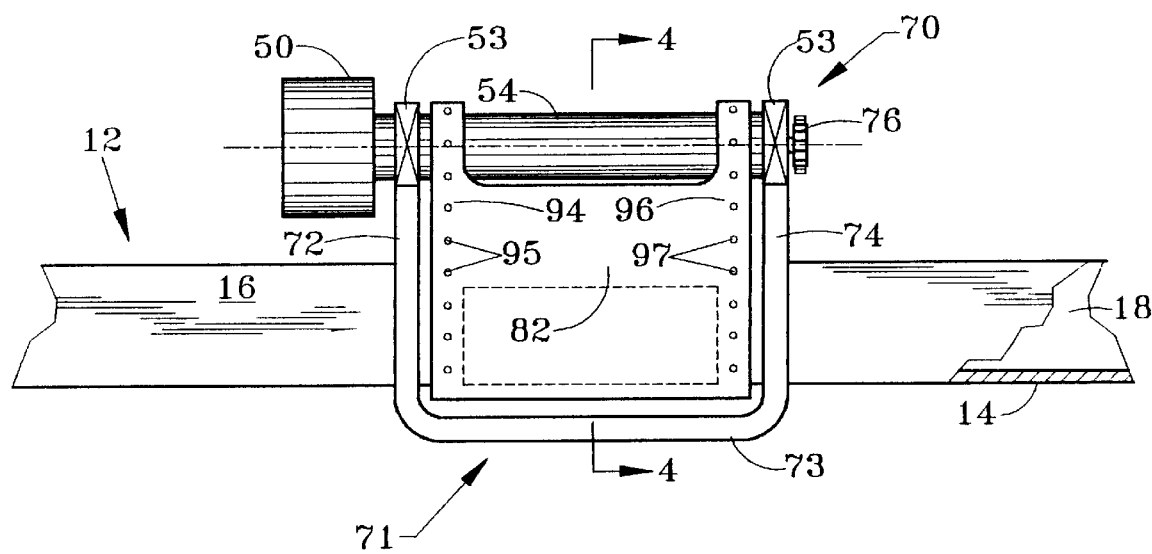
FIG. 3 is a side view of an alternate embodiment of a gate mechanism installed between an upstream portion and a downstream portion of a conveyor tray.

FIG. 3 discloses another embodiment of a gate mechanism 70 for selectively discharging goods from a conveyor 12. The components in FIGS. 3 and 4 which are functionally identical to components previously discussed are provided with the same reference numbers. The gate mechanism 70 may thus replace the gate mechanism 40 discussed above. In the FIG. 3 embodiment, the gate mechanism 70 includes an upstream plate 72 rigidly secured to an upstream portion of the tray 12, and a downstream plate 74 similarly secured to a downstream portion of the conveyor. These plates may be secured to the tray by any convenient means, such as welding. A lower plate 73 may structurally interconnect the upstream and downstream plates, thereby forming a generally U-shaped housing 71. Bearings 53 are provided at the upper ends of the plates 72 and 73 for rotatably guiding the shaft 54 which is powered by the rotary actuator 50.

Figure 4:
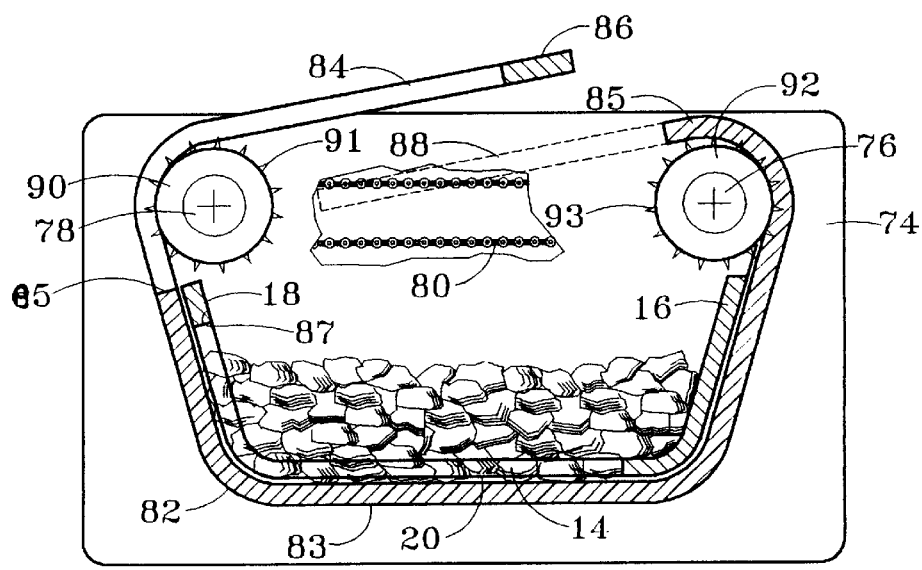
FIG. 4 is a cross-sectional view taken along lines 4—4 in FIG. 3.

As shown in FIGS. 3 and 4, a flexible sheet 82 includes a first solid sheet portion 83 which covers the discharge opening 20 in the conveyor tray 12 when the gate mechanism is in the closed position. This discharge opening 20 may thus be considered a discharge floor opening in the housing 71. The gate sheet 82 also includes an upstream flexible strap 94 and a downstream flexible strap 96, and a second end portion 86 spaced opposite the portion 83 from the upstream and downstream flexible straps. Since the gate sheet 82 is not a continuous looped belt, the second end portion 86 acts to interconnect the ends of the upstream and downstream flexible straps, such that the gate sheet opening 84 is spaced between the first portion 83 and the second portion 86, and between the upstream and downstream flexible straps 94 and 96.

The upstream portion and the downstream portion of the flexible sheet 82 are provided with perforations 95, 97 spaced along portions 83 and 86, and perforations are also spaced along the respective straps 94, 96. These perforations 95, 97 are spaced to receive the pins 91, 93 provided on the drive rollers 92, 90. As with the previously described embodiment, the shaft 54 may interconnect two upstream and downstream sprockets, or the pins 91, 93 may be provided on a uniform diameter roller extending between the upstream and the downstream edges of the sheet.

It is preferable for the embodiment shown in FIGS. 3 and 4 that of the upstream and the downstream left side rollers 90 and the upstream and the downstream right side rollers 92 are each driven by a single rotary actuator 50. Accordingly, a sprocket 76 may extend from the end of the shaft 54, and a chain 80 may be used to interconnect the sprocket 76 with a similar sprocket 78 mounted on another shaft containing upstream and downstream rollers on the opposing side of the conveyor. Accordingly, a single rotary actuator 50 may drive each of the rollers 90, 92 to reliably move the gate sheet 82.

In a preferred embodiment of the invention, the rotary actuator 50 is powered so that the sheet opening 84 moves upward past the opening 20 in the tray side or the housing side 18 when the sheet is moved to the closed position so as not to pinch goods between the trailing edge 85 of the sheet and the uppermost edge 87 of the opening 20. Referring for example to FIG. 4, the rotary actuator 50 is powered for moving the sheet 82 in the clockwise direction from the opened position to the closed position, and in the counterclockwise direction from the closed position to the opened position. As a tray sheet is rotated in a counterclockwise direction to the opened position, the sheet opening 84 initially begins to overlap with the opening 20 in the tray side or housing side 18, so that goods are initially discharged from the conveyor through this side opening. Continued movement of the sheet 82 in the counterclockwise direction then exposes the floor opening in the housing 71, so that goods drop vertically downward from the conveyor 12 to the downstream conveyor or other suitable downstream equipment. When the flexible sheet 82 is in the closed position, the top of the opening 20 is above the level of the product, as shown in FIG. 4. Accordingly, as the trailing edge 85 of the opening 84 approaches the top of the opening 20, the goods in the conveyor are not pinched between the surface 85 and the surface 87. The desired spacing of the surface 87 from the floor of the housing or the floor of the tray will in part depend upon the height of the conveyor tray or the height of the housing 71, and also on the size and characteristics of the material being conveyed.

For the embodiment as shown in FIGS. 3 and 4, the combination of the pins 91 and the perforations 95, 97 provide a fixed relationship between rotation of the shaft 54 and the position of the flexible sheet 82. Accordingly, a standard sensor (not shown) may be utilized to enable the control mechanism 36 to know the position of the gate sheet 82. Various types of sensors or motors encoders may thus be used to allow the automated conveyor system to know whether the gate sheet 82 is fully opened, fully closed, or partially opened. For the embodiment as shown in FIGS. 1 and 2, some slippage between the drive roller 58 and the flexible gate sheet 42 is possible, and accordingly a sensor responsive to rotation of the shaft 54 may not be able to reliably determine the position of the gate sheet 42 over a period of time. For this embodiment, a sensor 150 as shown in FIG. 2 may thus be provided at a fixed location relative to one of the end plates 38, 39. Various position indicators 152, 153, 154, and 156 may be spaced along the gate sheet 42, including one of the straps 46, 48. The sensor 150 may thus forward a signal to the computer 36 when the position device 152 passes by the sensor 150, thereby indicating that the gate sheet is in the fully closed position. Similarly, position sensor 156 may indicate that the gate sheet 42 is in the fully opened position. Position indicators 153 and 154 may provide indications that the gate sheet is in a predetermined partially opened position, i.e., 30% opened or 50% opened.

A significant advantage of the gated conveyor with the gate mechanism as discussed above is that the gate mechanism takes up very little room along the longitudinal length of the tray, and the gate mechanism does not extend transversely outwardly significantly from the sides of the tray. The compactness of the gate mechanism thus contributes to the acceptability of the gate mechanism to different users and for various applications.

Another advantage of the gate mechanism of the present invention is that the gate mechanism may be easily controlled for discharging only some of the goods moving along the conveyor to a downstream conveyor while other of the goods continue to pass by the gate mechanism. Prior art gate mechanisms tend to operate in either a fully opened or fully closed position. When gate mechanisms with special triangular shaped cutout openings were used, some ability was present to allow only some of the goods to be discharged from the conveyor, although these gate mechanisms tended to require long operator mechanisms and achieved only a limited control of the discharge rate of goods from the conveyor. As discussed herein, a flexible gate sheet moves transversely across the substantially planar tray opening or floor opening in the gate housing, and accordingly a selected transverse width of the opening may be adjusted to achieve the desired partial discharge of goods from the conveyor. Referring for example to FIG. 4, the flexible sheet 82 may be stopped at a position wherein the edge 85 of the opening 84 is in the approximate position of the intersection of the side opening with the floor opening, so that 15% of the goods moving along the tray are discharged through the side opening. If the flexible sheet 82 is moved further in the counterclockwise direction so that the edge 85 extends one third of the distance across the tray floor, approximately 45% of the goods may be discharged from the conveyor while 55% of the goods move past the gate mechanism. If the gate sheet 82 is positioned midway between the sides of the tray, approximately 65% of the goods may pass through the gate opening. Accordingly, the flexible gate sheet of the present invention allows the conveyor operator to manually control, or allows the computer 36 to automatically control, the amount of goods discharged from the conveyor in a highly reliable manner.

Figure 5:
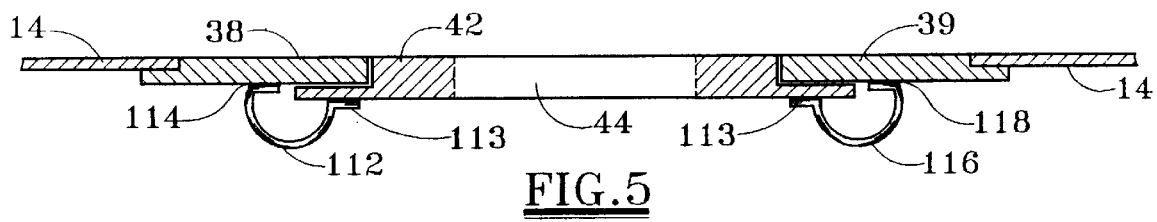
FIG. 5 is a cross-sectional view illustrating a conveyor floor and a floor of a suitable gate mechanism according to the present invention.

FIG. 5 is a cross-sectional view illustrating one embodiment of a conveyor floor of a suitable gate mechanism according to the present invention. As shown in FIG. 5, the upstream plate 38 may be welded or bolted to the tray floor, and the downstream plate 39 may be similarly welded or bolted to the conveyor tray floor. The gate sheet 42 is shown with the opening 44 therein for discharging goods from the conveyor. Preferably the upper surface of the conveyor floor 14, the upper surface of the floor of the plates 38, 39, and the upper surface of the gate sheet 42 lie substantially within a single plane so that goods move easily along the conveyor and through the opening 44 or along the conveyor and past the gate sheet 42 to a downstream portion of the conveyor. FIG. 5 also depicts a plurality of transversely placed upstream biasing members 112 and a plurality of similar downstream biasing members 116. Each of the biasing members may be welded or otherwise secured to the lower surface 114, 118 of the respective housing 38, 39. These biasing members may be formed from spring steel and exert a biasing force to press the gate sheet 42 into engagement with the gate housing or the conveyor tray. If desired, the free ends of the biasing members include pads 113 for minimizing wear on the biasing members during opening and closing of the gate sheet.

Figure 6:
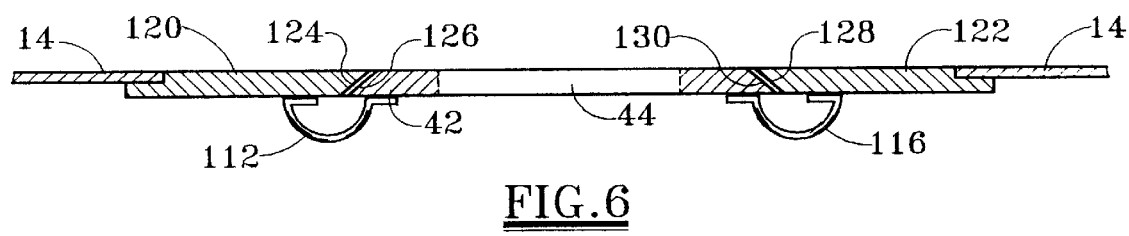
FIG. 6 is an alternate embodiment of the gate mechanism shown in FIG. 5.

FIG. 6 depicts in cross-section an alternate embodiment of a gate sheet with substantially the same components shown in FIG. 5. In FIG. 6, however, the edges of the upstream housing 120 and the downstream housing 122 are configured to produce tapered tray surfaces 124 and 128. The mating edges of the gate sheet 42 have corresponding tapered edge surfaces 126 and 130. The tapering of these surfaces further reduces the likelihood of goods, such as food particles, becoming trapped between the gate housing or tray and the flexible gate sheet during opening and closing of the gate mechanism. These tapered surfaces also automatically compensate for wear caused by movement of the gate sheet, thus prolonging the useful life of the gate mechanism.

Figure 7:
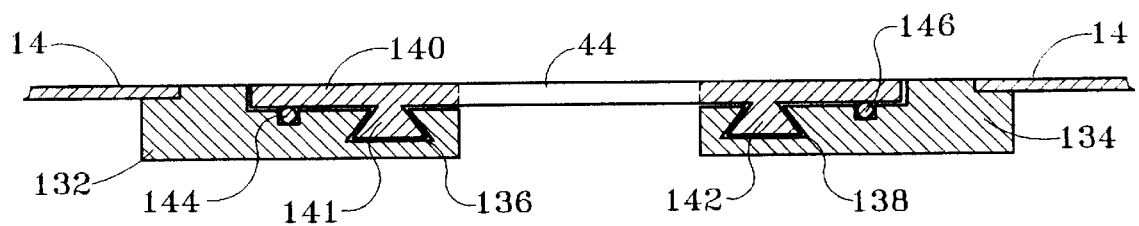
FIG. 7 is an alternate embodiment of the gate mechanism shown in FIG. 5.

FIG. 7 depicts yet another embodiment of the invention, wherein the upstream gate housing 132 and the downstream gate housing 134 each include a guide slot 136 and 138 therein. The upstream portion of the gate sheet 140 includes a dovetail guide member 141, and the downstream portion includes a similar dovetail guide member 142 for sliding within the respective slot 136 and 138 during opening and closing of the gate mechanism. The FIG. 7 embodiment also illustrates seals 144, 146 between the upstream portion of the gate sheet and the upstream housing 132, and between the downstream portion of the gate sheet and the downstream housing 134, respectively.

Those skilled in the art should now recognize the significant advantages of the flexible gate sheet according to the present invention. By providing a discharge opening both in the side of the conveyor tray or in the side of the gate housing and in the bottom of the tray or in the housing floor, damage to goods during gate closing is avoided. A seal is no longer required to effectively close off the conveyor opening since the opening preferably extends above the level of the goods moving along the conveyor. Problems with poor seal life are thus entirely eliminated. One continuous opening may be provided in the tray floor and in a side of the conveyor tray, as discussed above. Separate openings could alternatively be provided in the tray floor and the conveyor side. For example, a relatively short crossbar may separate a side opening from a floor opening, and another crossbar may separate one part of the floor opening from another part of the floor opening. These crossbars may not be very wide yet provide additional support between the sides of the opening, if such support is desired. A disadvantage of such crossbars, however, is that goods may be trapped between a crossbar and the trailing edge of the sheet opening. Accordingly, a continuous opening in both the tray floor and a side of the tray, as shown in the drawings, is preferred. Also, those skilled in the art will appreciate that the opening in the conveyor tray is preferably provided on at least one side of the tray, but alternatively could be provided on both sides of the conveyor tray, particularly for the embodiment wherein the gate sheet was a looped belt. By providing an opening on each side of the conveyor tray, with each opening extending upward from the tray floor to a level above that of the conveyed goods, a reversible drive motor may be used to selectively discharge goods from either the left side of the tray through a left-side tray opening, or from the right side of the tray through a right-side tray opening.

Prior art gate mechanisms included a gate closure which generally moved longitudinally along the tray centerline between the opened and the closed positions. The gate tray of the present invention preferably moves traversely with respect to the tray centerline between the open and closed positions, so that the full longitudinal length of the gate opening along the tray centerline is available for product discharge through the tray opening once the opening width becomes greater than the width of the product being conveyed. According to the present invention, the very small percentage of the total conveyor product flow may thus be discharged through the tray opening. According to the present invention, the tray width, the width between the tray sides, is significantly larger than the length of the tray opening along the tray centerline, and preferably the tray width is at least twice the length of the tray opening along the tray centerline. Accordingly, the gate sheet can be easily controlled to discharge very small quantities of product through the tray opening, and the amount of product discharged through the tray opening may be closely controlled as a function of the position of the gate sheet with respect to the tray opening.

The gated conveyor substantially as shown in FIG. 1 may thus include an elongate tray, a powered tray drive mechanism, and a gate mechanism substantially as shown in FIG. 1. In another embodiment of the invention, a manufacturer may sell only a gate mechanism for installing along a conveyor tray. Most commonly, such an improved gate mechanism would replace an existing gate mechanism. Due to problems associated with reliably securing the gate mechanism to the existing tray, it may be preferable for many refurbishment applications to provide a combination gate mechanism and tray as a subassembly, so that the tray with the gate mechanism already installed therein is used to replace an existing tray or an existing tray and gate mechanism in a refurbished cyclically powered conveyor.

As disclosed herein, various gate sheet sensors or motor shaft sensors may be used to allow the automated conveyor system to automatically know the position of the gate sheet with respect to the opening in the tray. Accordingly, the gate sheet may be automatically moved from the fully open to the fully closed position, or from either of these positions to a selected partially opened position, depending on the desires of the operator.

Flexible gate sheets for the gate mechanism as discussed above include a continuous band or looped gate sheet, a looped gate sheet with the ends connected by a pin or other hinge mechanism, and a gate sheet as shown in FIG. 4 where the ends do not engage. Another type of gate sheet according to this invention utilizes a coiled gate sheet. In this design, a portion of the gate sheet is wound or coiled around the pair of rollers in a manner conventional to the rolling film in a camera. With this design, the top of the tray may be completely opened, so that an operator or automated equipment may continually look down onto the goods being conveyed through the gate mechanism without the gate sheet blocking this view. Another feature of this wound or coiled gate sheet is that the gate sheet itself may be quite long, and thus may have several different sized gate sheet openings therein to either accommodate different products on the same conveyor, or to regulate the amount of product being conveyed through an opening. Ports in the gate sheet may have selectively sized holes therein to allow the gate to act as a screening device when the holes in the gate sheet are aligned with the tray opening. This design also permits easy removal of the gate sheet for cleaning and sheet replacement.

Those skilled in the art will appreciate that various other types of biasing members may be used to bias the gate sheet into engagement with the tray or the gate housing. Similarly, other types of guide members may be used to ensure reliable guided movement of the flexible gate sheet with respect to the tray or the gate housing during opening and closing of the gate sheet.

Various modifications to the conveyor and the gate mechanism and to the techniques and methods described herein should be apparent from the above description of the preferred embodiments. Although the invention has thus been described in detail for these embodiments, it should be understood that this explanation is for illustration, and the invention is not limited to the described embodiments. Equipment and operating techniques will thus be apparent to those skilled in the art in view of this disclosure. Further modifications are thus contemplated and may be made without departing from the spirit of the invention which is defined by the following claims.

What is claimed is:

1. A gated conveyor for moving goods and for selectively discharging goods from the conveyor, the conveyor comprising:
   an elongate tray having a substantially planar tray floor for supporting the goods thereon and first and second tray sides on opposing transverse sides of the tray floor, the tray floor having a tray opening therein for discharging goods from the conveyor;
   a cyclically powered drive mechanism for moving the goods along the elongate tray; and
   a gate mechanism for selectively opening and closing the tray opening, the gate mechanism including a flexible gate sheet transversely movable between an opened position to expose the tray opening and a closed position to cover the tray opening, the flexible gate sheet moving both transversely with respect to the tray floor and vertically with respect to at least one of the first and second tray sides while moving between the opened and the closed positions.

2. The gated conveyor as defined in claim 1, wherein the tray opening extends into at least one of the first and second tray sides and upwardly from the tray floor at least sixty percent of a vertical spacing between the tray floor and an uppermost end of the respective tray side.

3. The gated conveyor as defined in claim 1, wherein the gate mechanism comprises:
   a rotary drive member for engaging and moving the flexible gate sheet; and
   a drive motor for rotating the rotary drive member.

4. The gated conveyor as defined in claim 3, further comprising:
   one or more idler rollers for engaging the flexible gate sheet.

5. The gated conveyor as defined in claim 1, wherein the flexible gate sheet forms a looped belt having a sheet opening therein.

6. The gated conveyor as defined in claim 1, further comprising:

a plurality of upstream laterally spaced biasing members for biasing the flexible gate sheet into engagement with the conveyor tray; and a plurality of downstream laterally spaced biasing members for biasing the flexible gate sheet into engagement with the conveyor tray.

7. The gated conveyor as defined in claim 1, wherein:

each of an upstream edge and a downstream edge of the tray opening has a tapered tray surface; and the flexible gate sheet having an upstream tapered edge sheet surface and a downstream tapered edge sheet surface each for mating engagement with a corresponding tapered tray surface.

8. The gated conveyor as defined in claim 1, further comprising:

the tray including a lateral guide slot; and the flexible gate sheet including a guide member for receipt within the guide slot to guide movement of the flexible gate sheet relative to the conveyor tray.

9. The gated conveyor as defined in claim 1, further comprising:

at least one sealing member for sealing between the flexible gate sheet and the conveyor tray.

10. The gated conveyor as defined in claim 1, wherein the gate sheet has a first portion for positioning across the tray opening to cover the tray opening, an upstream flexible strap connected to the first portion, a downstream flexible strap connected to the first portion, and a gate sheet opening between the first and second flexible straps.

11. A gate mechanism for selectively discharging goods from a conveyor, the conveyor including a tray having a substantially planar tray floor for supporting the goods thereon and first and second tray sides on opposing sides of the tray floor, the tray having a gap therein between an upstream portion and a downstream portion, and a cyclically powered drive mechanism for moving the goods longitudinally along the tray, the gate mechanism comprising:

a gate housing for interconnection between the upstream portion and the downstream portion of the tray and fitted within the gap in the tray, the gate housing having a substantially planar floor opening and first and second opposing housing sides each extending upward from the floor opening;

a flexible gate sheet supported on the gate housing and movable between an opened position to expose the floor opening and a closed position to cover the floor opening, the flexible gate sheet movable both transversely with respect to the floor opening and vertically with respect to at least one of the housing sides while moving between the opened and closed positions; and a powered drive member for moving the flexible sheet between the opened and closed positions.

12. The gate mechanism as defined in claim 11, further comprising:

a side opening in the at least one of the housing sides, the side opening extending upwardly from the floor opening at least 8 cm.

13. The gate mechanism as defined in claim 11, further comprising:

a plurality of upstream laterally spaced biasing members for biasing the flexible gate sheet into engagement with the gate housing;

a plurality of downstream laterally spaced biasing members for biasing the flexible gate sheet into engagement with the gate housing; and a rotary drive member driven by the powered drive member for engaging and moving the flexible gate sheet.

14. The gate mechanism as defined in claim 11, wherein the gate sheet has a first portion for positioning across both the floor opening, an upstream flexible strap connected to the first portion, a downstream flexible strap connected to the first portion, and a gate sheet opening between the first and second flexible straps.

15. The gate mechanism as defined in claim 14, further comprising:

the gate sheet having a second portion spaced opposite the first portion from the upstream and downstream flexible straps and interconnecting ends of the upstream and downstream flexible straps, the gate sheet opening being spaced between the first portion and the second portion.

16. A method of selectively discharging goods from a conveyor, the conveyor including an elongate tray having a substantially planar tray floor for supporting the goods thereon and first and second tray sides on opposing transverse sides of the tray floor, and a cyclically powered drive mechanism for moving the goods longitudinally along the tray, the method comprising:

providing a floor opening in the tray floor;

providing a flexible gate sheet transversely movable from an opened position to a closed position, moving the flexible gate sheet both transversely with respect to the tray floor and vertically with respect to at least one of the first and second tray sides from the closed position to the opened position to discharge goods from the conveyor; and moving the flexible gate sheet both transversely with respect to the tray floor and vertically with respect to the at least one of the first and second tray sides from the opened position to the closed position to move goods along the tray and past the flexible gate sheet.

17. The method as defined in claim 16, further comprising:

electrically powering a drive member for moving the flexible gate sheet from the opened to the closed position.

18. The method as defined in claim 16, further comprising:

providing a side opening in at least one of the first and second tray sides, the side opening extending upward from the tray opening a distance greater than an anticipated depth of goods moving along the tray.

19. The method as defined in claim 18, further comprising:

forming the gate sheet to include a first portion for positioning across both the floor opening and the side opening, an upstream flexible strap connected to the first portion, a downstream flexible strap connected to the first portion, a second portion spaced opposite the first portion from the upstream and downstream flexible straps and interconnecting the first and second downstream straps, and gate sheet opening being spaced between the first portion and the second portion and between the first and second flexible straps.

20. The method as defined in claim 16, further comprising:

biasing the flexible gate sheet into engagement with the conveyor tray.

* * * * *